(12) United States Patent
Yunck

(10) Patent No.: US 10,718,869 B2
(45) Date of Patent: Jul. 21, 2020

(54) SYMMETRICAL MULTISTATIC RADAR CONSTELLATION FOR EARTH OBSERVATION

(71) Applicant: GeoOptics, Inc., Pasadena, CA (US)

(72) Inventor: Thomas Patrick Yunck, Pasadena, CA (US)

(73) Assignee: GeoOptics, Inc., Pasadena, CA (US)

( * ) Notice: Subject to any disclaimer, the term of this patent is extended or adjusted under 35 U.S.C. 154(b) by 292 days.

(21) Appl. No.: 15/912,041

(22) Filed: Mar. 5, 2018

(65) Prior Publication Data

US 2020/0191930 A1    Jun. 18, 2020

(51) Int. Cl.
| | | |
|---|---|---|
| G01S 19/44 | (2010.01) | |
| G01S 19/22 | (2010.01) | |
| G01S 19/14 | (2010.01) | |

(52) U.S. Cl.
CPC .................................. G01S 19/22 (2013.01)

(58) Field of Classification Search
CPC .................................................. G01S 19/14–30
See application file for complete search history.

(56) References Cited

U.S. PATENT DOCUMENTS

| | | |
|---|---|---|
| 4,602,257 A | 7/1986 | Grisham |
| 6,388,606 B1 | 5/2002 | Keydel et al. |
| 6,677,884 B2 | 1/2004 | Moreira |
| 6,864,828 B1 | 3/2005 | Golubiewski |
| 7,728,759 B2 * | 6/2010 | Tillotson ............... G01S 19/14 342/26 A |
| 9,857,475 B2 * | 1/2018 | Yunck .................. G01S 19/14 |
| 2002/0041328 A1 | 4/2002 | LeCompte et al. |
| 2004/0145514 A1 | 7/2004 | Raney |
| 2006/0077094 A1 | 4/2006 | Eisenstein |
| 2006/0164288 A1 | 7/2006 | Voelker |
| 2007/0040736 A1 * | 2/2007 | Damidaux ............. G01S 19/02 342/357.395 |
| 2007/0090990 A1 | 4/2007 | Nelson |
| 2009/0022088 A1 | 1/2009 | Wahlberg et al. |
| 2010/0045512 A1 | 2/2010 | Nelson |
| 2011/0169684 A1 | 7/2011 | Margolin |
| 2017/0124229 A1 * | 5/2017 | Rosti ..................... H04L 65/608 |
| 2018/0037336 A1 * | 2/2018 | Rammos ............ H04W 84/005 |

(Continued)

OTHER PUBLICATIONS

C. Ruf, et al., The NASA EV-2 Cyclone Global Navigation Satellite System (CYGNSS) Mission, IEEE, 2013.

(Continued)

*Primary Examiner* — Mamadou L Diallo
(74) *Attorney, Agent, or Firm* — Daylight Law, P.C.

(57) ABSTRACT

A constellation of satellites and associated methods for Earth Observation are disclosed. One method includes transmitting a set of at least four signals towards the Earth using a constellation of at least four satellites and receiving a set of at least four reflected signals from the Earth using the constellation. The method also includes analyzing, using a set of at least four signal analyzers, the set of at least four signals to generate a set of data. Each satellite in the constellation individually houses a signal analyzer in the set of at least four signal analyzers. The method also includes deriving the set of Earth observations using the set of data. Each satellite receives a signal in the set of at least four signals from every other satellite in the constellation.

24 Claims, 9 Drawing Sheets

(56) References Cited

U.S. PATENT DOCUMENTS

| | | | | |
|---|---|---|---|---|
| 2018/0156924 | A1* | 6/2018 | Reedy | A61P 35/00 |
| 2020/0041658 | A1* | 2/2020 | Laurichesse | G01S 19/02 |

OTHER PUBLICATIONS

D. Tridon, et al., The Future of TanDEM-X: Final Dem and Beyond, 11th European Conference on Synthetic Aperature Radar, pp. 541-545, 2016. GNNS for bistatic (Lulea University).

E. Gillard, CYGNSS Satellite Mission Aims to Improve Hurricane Forecasting, Oct. 31, 2016, Available at: https://www.nasa.gov/feature/langley/cygnss-satellite-mission-aims-to-improve-hurricane-forecasting (Accessed on: Feb. 28, 2018).

H. Carreno-Luengo, An Experimental Nanosatellite for GNSS-R Earth Observation: Mission Concept and Analysis, IEEE Journal of Selected Topics in Applied Earth Observations and Remote Sensing, vol. 9, No. 10, Oct. 2016.

J. Dickinson, et al., Avionics of the Cyclone Global Navigation Satellite System (CYGNSS) Microsat Constellation, IEEE, 2012.

M. Eineder, et al., Tandem-L Satellite Mission Proposal for Monitoring Dynamic Process on the Earth's Surface, DLR, Cologne, Germany, Apr. 2014.

M. Martin-Neira, et al., Study of a Constellation of Bistatic Radar Altimeters for Mesoscale Ocean Applications, IEEE Transactions on Geoscience and Remote Sensing, vol. 36, No. 6, Nov. 1998.

T.P. Yunck, et al., Global Navigation Satellite Sounding of the Atmosphere and GNSS Altimetry: Prospects for Geosciences, Jet propulsion Laboratory, CA Inst. of Tech., Pasadena, CA, 1987.

International Search Report and Written Opinion dated May 23, 2019 from International Application No. PCT/US2019/020328 filed Mar. 1, 2019, 15 pages.

* cited by examiner

FIG. 5

500 4 Satellites – 9 Tracks 510 8 Satellites – 27 Tracks 515 8 Satellites – 27 Tracks 520 16 Satellites – 81 Tracks

SYMMETRICAL MULTISTATIC RADAR CONSTELLATION FOR EARTH OBSERVATION

BACKGROUND

There are over a thousand active satellites in Earth orbit. The missions of these satellites vary greatly in terms of scope and objective, and include missions that provide observation, communication, and positioning services. Traditionally, many satellite programs have focused on a single platform for mission execution. The single platform model is still in widespread use, with current observation missions flown by NASA and NOAA including multi-purpose observing platforms with costs surpassing $3B per satellite. However, modern missions include those executed by constellations of several satellites working in combination. In the field of positioning services, global navigation satellite systems (GNSS) are provided today by constellations of satellites operating in concert such as the GPS, GLONASS, Galileo, and Beidou constellations. Communications missions also traditionally focused on a single platform responsible for broadcasting to a given geographic area. However, that sector has developed to include the use of constellations of satellites, and large constellations of low earth orbit (LEO) satellites using Ku- or Ka-band spectrum are currently being developed to provide diverse satellite-based internet communications. Imaging observation missions are today often conducted by constellations of satellites to increase the area that can be imaged and reduce latency. Furthermore, companies such as GeoOptics are currently developing cubesats for other types of Earth observation missions such as atmospheric radio occultation (RO).

The use of less expensive smaller satellites has proved beneficial from both a cost and performance perspective across a wide range of observation paradigms. For example, in terms of optical imaging improvements, some private companies have utilized cubesats flying in particular formations to provide a more complete and up-to-date image of the Earth, the benefit being that more eyes in more places get more information. However, constellations also provide a benefit in terms of their ability to correlate and compare observations of the same phenomenon to enhance the information return. RO observations have benefited from the use of constellations in this way. RO involves observing the change in a radio signal as it passes through a medium to obtain information regarding that medium. For example, RO conducted with the radio signals produced by GNSS can provide information regarding the Earth's atmosphere. See, T. P. Yunck and G. A. Hajj, Global Navigation Satellite Sounding of the Atmosphere and GNSS Altimetry: Prospects for Geosciences, Jet propulsion Laboratory, CA Inst. Of Tech., Pasadena, Calif., 1987. Current RO missions involving two or more satellites include Germany's TerraSAR-X and Tandem-X radar imaging systems as well as Taiwan's COSMIC system of GNSS RO satellites. In addition to RO, constellations of satellites have also been considered as a potential vehicle for obtaining altimetry and other measurements regarding the Earth's surface. For example, the NASA funded Cyclone Global Navigation Satellite System (CYGNSS) is being designed with the hope of being able to passively observe reflections of GNSS signals off the Earth with a constellation of satellites in order to obtain information regarding ocean surface winds.

SUMMARY

A constellation of satellites for Earth observation and associated methods are disclosed. As used herein, the term Earth observation includes all measurements conducted by a satellite for purposes of obtaining information concerning the Earth's surface or atmosphere. For example, Earth observations include: global ocean, ice, and land altimetry; global ocean scatterometry; surface topography; atmospheric and surface temperature sensing; plant land cover and canopy height sensing; geological radar sounding; three-dimensional ionospheric mapping; and other observations. The information gleaned from these observations can be compounded by additional analysis to obtain further Earth observations such as littoral sea surface heights, surface vector winds, glacier recession, soil moisture variations, global temperature variations, deforestation, and other more complex observations. The constellation can include many individual satellites in order to obtain multiple measurements of a single location on Earth simultaneously, or of the whole earth quickly.

In certain approaches, every satellite in the constellation can be configured to both transmit and receive sounding signals to and from the surface of the Earth. Therefore, in contrast to asymmetrical systems in which one device transmits sounding signals, and another device or set of devices receive those sounding signals, the constellation can be symmetrical with all satellites serving as both transmitters and receivers either simultaneously or in sequence. Furthermore, satellites in the constellation can be configured to both transmit signals to other satellites in the constellation and receive signals from other satellites in the constellation. Therefore, in contrast to monostatic systems in which one device transmits a sounding signal and also receives that sounding signal, the constellation can be bistatic or multistatic. Furthermore, the satellites can fly in formation at a similar or equal altitude. In certain approaches, the constellation will comprise at least four satellites. The set of at least four satellites can then generate two sets of forward scatter observations of a single location on the Earth's surface from multiple perspectives, but with the same look angle. This provides a significant benefit in terms of the ability of the system to conduct accurate scatterometry as described below.

In certain approaches, the sounding signals transmitted by the satellites in the constellation can be encoded with a unique encoding that is specific to the individual satellite in the constellation that generated the signal. In certain approaches, the unique encoding is achieved via a pseudo-random noise code (PN code) modulation. As a result, the source of a received sounding signal can be determined by a recipient satellite using readily available PN code receivers, and the transmitting satellite can generate that encoding using a readily available PN code transmitter. Furthermore, regardless of how the encoding is conducted, the constellation benefits from being able to determine the source of a received signal, making measurements conducted on the signal more meaningful. For example, if the received signal is attenuated by a degree "X" as compared to a baseline, and the source of the signal was a distance "Y", the attenuation and distance can both be utilized to provide information concerning the medium through which the signal traveled and/or the manner in which the signal was reflected off the Earth's surface.

In certain approaches, the constellation can be located in low earth orbit (LEO). This provides certain benefits in that the transmitted sounding signals do not need to travel far, and the system can be designed for minimum mass or power, or to utilize frequencies that would not otherwise have been available for use. The constellation can be designed to exhibit a nominal cell altitude of 500 km such that far less power and/or antenna size is required for its transmitters as compared to satellites in geosynchronous orbits. Also, satellites in LEO will be able to accurately determine their position with the use of an upward facing antenna that can receive signals from a GNSS network in high Earth orbit such as the GPS constellation.

FIG. 1 provides an illustration of the concepts involved with a constellation of satellites 100 that is used to both transmit and receive sounding signals with respect to the Earth's surface. The sounding signals are illustrated by lines connecting the satellites in constellation 100 to the surface of the Earth 101. For example, monostatic sounding pair 102 connects satellite 103 to the surface of the Earth 101. In the upper half of the figure, the monostatic transmission signals are illustrated alone for clarity. A monostatic sounding pair is formed by a pair of sounding signals: a transmitted sounding signal sent from the satellite to the surface of the earth and a backscatter signal that is reflected off the Earth back to the satellite. In the lower half of the figure, the full multistatic transmission signals are illustrated along with the monostatic transmission signals. A bistatic sounding pair is formed by a pair of sounding signals: a transmitted sounding signal sent from a satellite to the surface of the Earth and a forward scatter signal that is reflected off the Earth to another satellite in the constellation. As such, lines 104 and 106 can include two sets of sounding signals as both satellite 105 and satellite 103 can individually transmit to and receive from their counterpart satellite.

The number of available observations generated by a constellation such as constellation 100 is very large. As illustrated, each satellite in the constellation, besides the transmitting satellite, can individually receive a unique forward scatter signal originating with any transmitting satellite in the constellation. Therefore, with "n" equal to the number of satellites in the constellation, the number of observations due to forward scatter signals is n(n−1) and the full set of observations, including those attributable to monostatic backscatter observations, is $n^2$. Furthermore, the provided number for forward scatter signals is only the number of observations of the first forward scatter off evenly spaced observation points that are first to arrive from a transmission pulse of a transmitting satellite. As will be described, the number of both monostatic and bistatic observations can be dramatically increased by: conducting measurements off the orbit axis of the constellation and across the orbit axis of the constellation at any point; beam steering the antennas of the constellation; and conducting various forms and combinations of time, frequency, or code-based gating on the sounding signals.

The term "signal" is used herein to refer to a system element characterized by both the information contained in a propagating electromagnetic wave as well as a major physical characteristic of the propagating electromagnetic wave. However, those of ordinary skill in the art will understand that the same information, such as the encoding mentioned above, can be contained in both the transmitted sounding signal and the reflected back scatter or forward scatter signal. As a result, in approaches in which the sounding signals are encoded with information identifying their source, a single satellite can easily receive and process multiple sounding signals from the other satellites in the constellation simultaneously while keeping track of the source of each signal. In cases in which the encoding is conducted via PN code modulation, the same technology that allows a terrestrial cellular base station to handle and route multiple phone calls in a busy area can be used to distinguish all the component forward scatter signals of the constellation at a single satellite.

Constellations of satellites in accordance with constellation 100 can generate a wealth of high quality Earth observations for several reasons. First, in contrast to a GNSS observation constellation, the sounding signals can be customized in terms of their frequency, amplitude, and transmission time to be optimized for the sake of generating those observations instead of for being used to transmit information for another purpose. Second, the use of at least four satellites in the constellation assures that at least two sets of forward scatter signals are available to observe a single point from a given look angle off nadir, but from different perspectives. This is beneficial because forward scatter signals off a specular reflection point are easier to detect than back scatter signals as more energy tends to scatter forward off a relatively smooth surface than backward for transmissions directed off nadir. This aspect also provides certain benefits for scatterometry observations as described in more detail below. Third, the signal analyzers housed on each satellite can observe not only the change in amplitude or transmission time of each signal, but also the phase, frequency, and polarization. In the specific case of a constellation in which the sounding signals are encoded with information identifying individual satellites, the large number of signals can be easily parsed to obtain all of this information without a great degree of work. This can also be done with readily available parts such as PN signal analyzers that are preconfigured to split out different PN code modulated signals from a single feed, and generate all the information mentioned above. In terrestrial telecommunication networks, this information is generally used for other purposes, such as those associated with enhancing phone call quality and modifying the strength of transmission or reception configuration for a telecommunications network. However, the same information can be utilized to generate Earth observations. Fourth, if the constellation of satellites is in low earth orbit (LEO) the satellites can utilize an existing network of high Earth orbiting (HEO) navigation satellites such as GNSS to determine their position relative to one another in order to enhance the utility of the information provided by the signal analyzers.

FIG. 2 includes a flow chart 200 for a set of methods for operating a symmetrical multistatic constellation of at least four satellites to generate a set of Earth observations. Flow chart 200 includes a step 201 of transmitting a set of at least four sounding signals from the constellation towards the Earth. As illustrated by sketch 210, each of the sounding signals can be directed towards a single location on the Earth's surface. Each satellite in the constellation individually generates at least one sounding signal in the set of sounding signals. The sounding signals can be encoded with an encoding that specifically and uniquely identifies the satellite that generated the sounding signal. The satellites can be in LEO and the sounding signals can be selected to allow for the generation of adequate forward scatter while preserving power in light of their closer proximity to Earth as compared to satellites in higher orbits.

Flow chart 200 also includes a step 202 of detecting a set of at least four forward scatter signals from the Earth using the constellation. The signals in the set of forward scatter signals uniquely correspond with the signals in the set of sounding signals to form a set of sounding pairs. The signals in each sounding pair in the set of sounding pairs are transmitted and received by different satellites in the constellation. Illustration 220 shows two forward scatter signals using dotted lines that are generated by half of the sounding signals from illustration 210. The forward scatter signals can all be reflected off the same area of the Earth's surface. The central location from which the signals are reflected off the Earth's surface can be referred to as the reflection point of the signals. The sounding pairs of a given constellation can target different reflection points or the same reflection points. The constellation can also target multiple reflection points simultaneously if desired. Each satellite in the constellation can receive a forward scatter signal from every other satellite in the constellation as reflected off that same area.

Flow chart 200 also includes a step 203 of receiving a set of at least four back scatter signals from the Earth using the constellation. The signals in the set of back scatter signals form monostatic sounding pairs with the sounding signals generated by each satellite. Illustration 230 shows two sets of back scatter sounding pairs individually illustrated by single lines to illustrate how the same satellite receives a back scatter signal and generates the originating transmission signal of the sounding pair. Steps 202 and 203 occupy an equal rank in the flow chart because they can be conducted nearly simultaneously as the same sounding signals that generate the forward scatter signals can generate the back scatter signals for the constellation. In general, in approaches in which the constellation is observing forward scatter from specular reflection points, the back scatter signals will be weaker because more energy tends to scatter forward than backward when the transmissions are directed off nadir. All three of steps 201-203 can be conducted with beam steering and/or any form of signal gating to generate and capture observations at any point along the image plane of the constellation as well as from points outside the image plane.

Flow chart 200 also includes a step 204 of analyzing the scatter signals to obtain a set of data. Each forward scatter signal can be analyzed by a different satellite in the constellation. From the perspective of the analyzer, the two elements of a sounding pair can be referred to as the emitted signal and the received signal. Step 204 can also, in combination or in the alternative, involve analyzing the set of at least four back scatter signals to obtain the set of data. The analysis can be conducted by signal analyzers located on the receiving satellites. The constellation can include a set of signal analyzers, and each satellite in the constellation can individually house a signal analyzer in that set of signal analyzers. The analysis can include determining the delay, amplitude, phase, frequency, polarization, encoding, or other feature of the received signal. The signal analyzers can be PN code signal analyzers and the analyzing can involve determining a unique PN code that was used to modulate the received signal. Assuming full mutual visibility, analyzing step 204 can be conducted using a number of forward scatter signals equal to n(n−1) where n is the number of satellites in the constellation. Analyzing step 204 can alternatively be conducted using a number of forward and back scatter signals equal to $n^2$ where n is the number of satellites in the constellation. Furthermore, with appropriate beam steering conducted in step 201, the analyzing step can involve measurement taken from many points out of the image plane which dramatically increases the number of observations. The analysis and/or reception steps 202-204 can be conducted using any form of time, frequency, or code-based gating to filter desired signals from unwanted signals. The gating could involve range gating. The gating can be conducted by fixed hardware on the satellites, or by mechanical, electrical analog, or digital filtering systems under the control of the software on the satellites.

Flow chart 200 also includes a step 205 of deriving a set of Earth observations using the data obtained in step 204. The step can be conducted by a terrestrial computer system after the data obtained in step 204 is transmitted to a ground station on Earth. The terrestrial computer system can be a server. The data from the constellation, all the way down to the primitive components of the sounding signals, can be stored in a data store that the server has access to. Alternatively, the data generated by the constellation can be stored by the constellation in a concentrated or distributed fashion. Alternatively or in combination, the data can be generated by the constellation at a single satellite or using a distributed computing approach. Specialized satellites in the constellation can be non-identical to the others and configured specifically for data storage or computation. The data obtained in step 204 can be shared between devices in the constellation to facilitate this analysis. Both the terrestrial or satellite-based analysis can be conducted in real time or using batch processing. The analysis can also utilize data regarding the position and identity of the satellites in the constellation during transmission and/or reception. In situations in which the satellites are in LEO, the position of the satellites can be determined by GNSS data obtained by the satellites during operation. The deriving can include scatterometry, altimetry, synthetic aperture radar (SAR), and interferometric derivations such as interferometric SAR (InSAR) derivations.

Flow chart 200 also includes a step 206 of setting or adjusting the spacing in the constellation. The relative positions of the satellites can be a set component of the mission or variable once the mission is in operation. The setting and adjusting of the spacing can be conducted relative to the direction of the constellation's orbit 241, as shown in illustration 240. The spacing can also be set or vary based on the requirements of the mission. Spacing can also be set or adjusted on an individual basis such that one or two satellites can change their position while the others maintain their relative positions with respect to the rest of the constellation. Movement along the direction of orbit 241 relative to the remainder of the constellation can be referred to as axial movement. Movement perpendicular to the direction of orbit 241 relative to the remainder of the constellation can be referred to as lateral movement. The satellites can be designed to adjust their position along either direction.

BRIEF DESCRIPTION OF THE DRAWINGS

FIG. 5 provides three aft-perspective orbit diagrams for a constellation of satellites with uneven lateral orbit tracks and even observation tracks along with a top-down orbit diagram for one of those constellations, all of which are in accordance with approaches disclosed herein.

DETAILED DESCRIPTION

Figure 1:
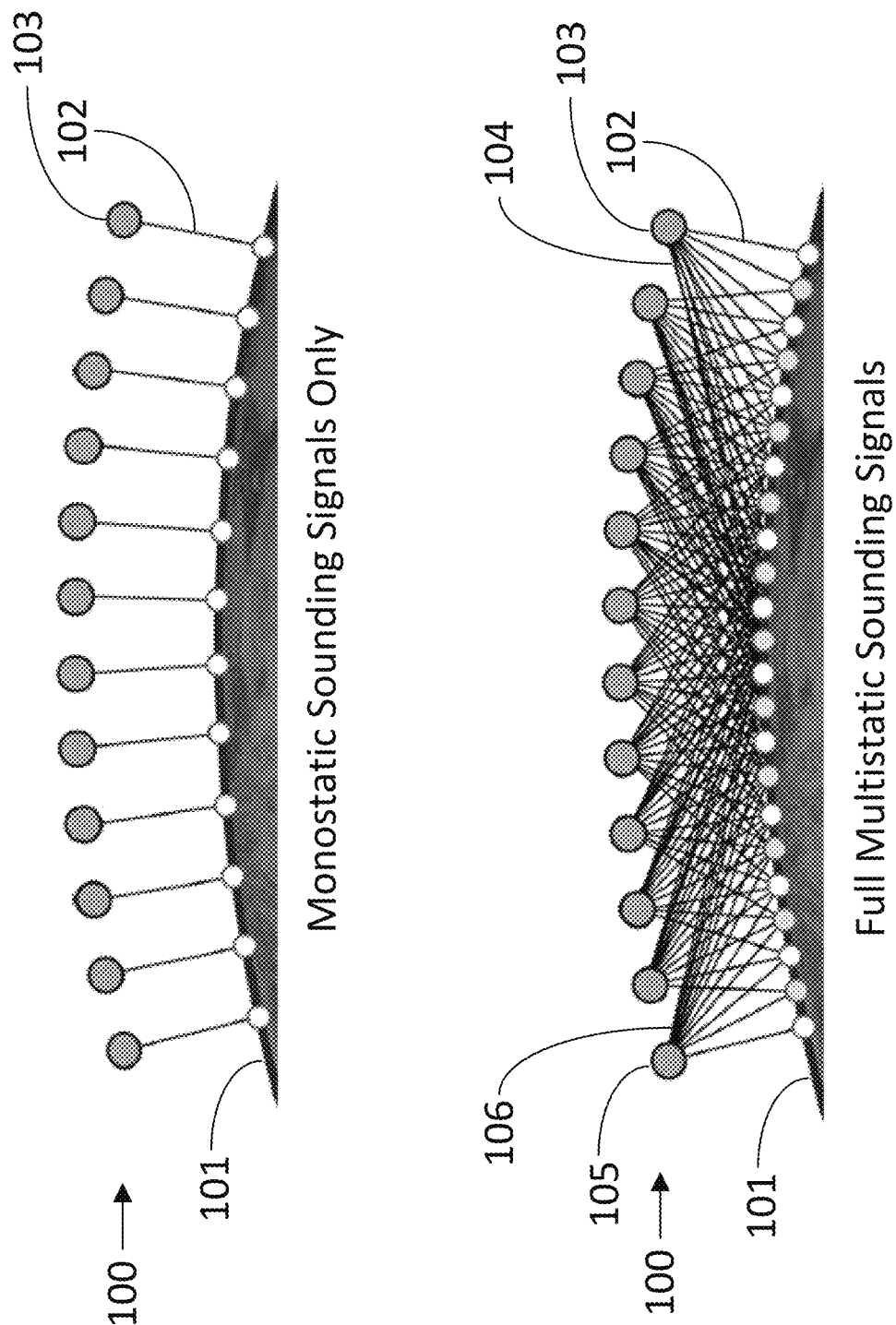
FIG. 1 provides illustrations of the concepts involved with a constellation of satellites that both transmit and receive sounding signals with respect to the Earth's surface in accordance with approaches disclosed herein.
Figure 2:
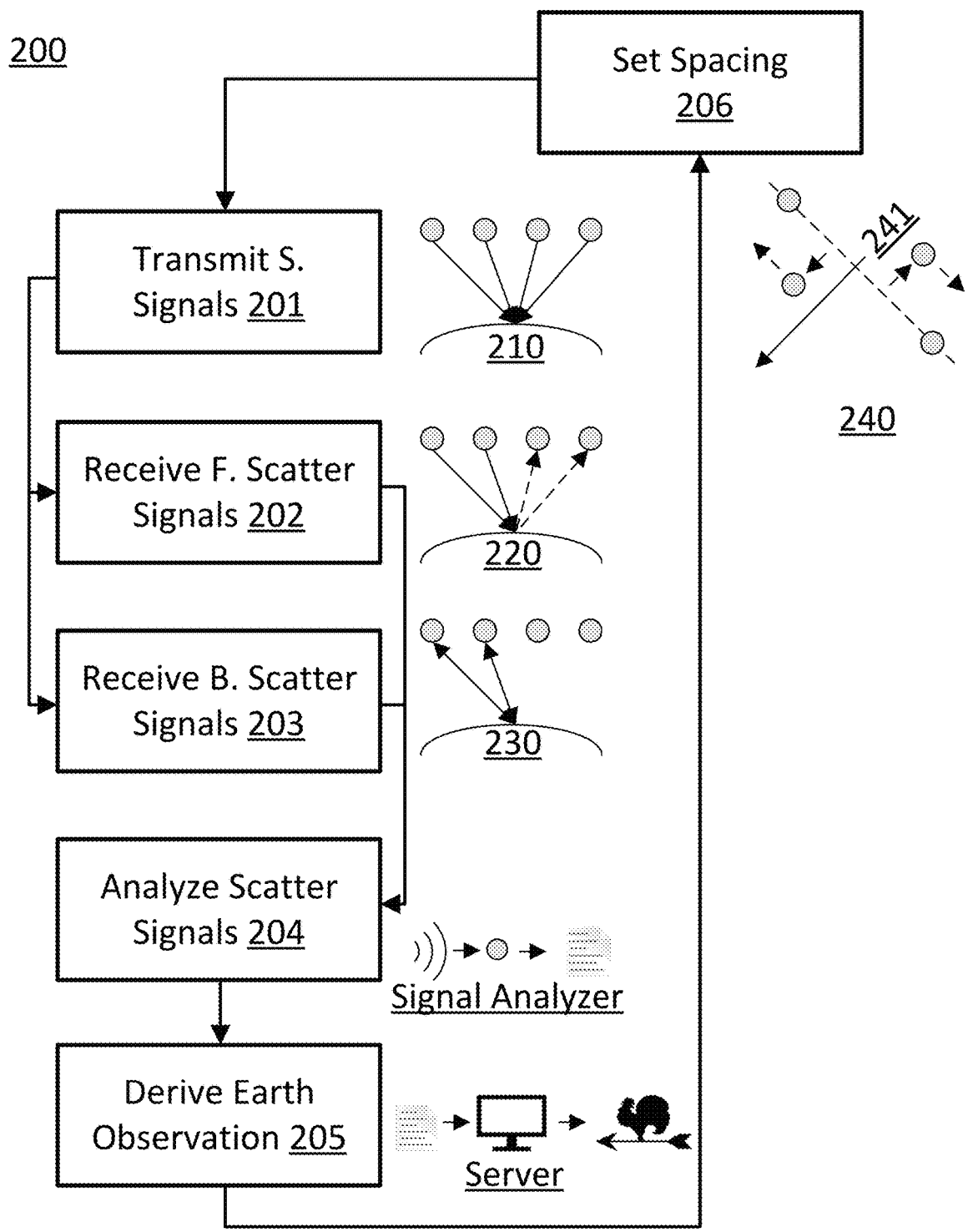
FIG. 2 includes a flow chart of a set of methods for operating a symmetrical multistatic constellation of at least four satellites to generate a set of Earth observations in accordance with approaches disclosed herein.

This disclosure includes details regarding specific implementations of the constellation of satellites for Earth observation and associated methods described in the summary above. It includes additional details regarding the component satellites of the constellation, implementations of the steps of FIG. 2 above, and additional approaches that can be used to enhance the performance of a multistatic constellation of satellites for Earth observation. The component satellites of the disclosed constellation can be relatively low-cost satellites such as cubesats that can be batch manufactured and placed in orbit using a single launch for a few million dollars per satellite. This is a major improvement over traditional single-platform approaches in which individual satellites cost $500M or more. The individual satellites can be equipped with proven signal analyzer technology, conventionally used in terrestrial telecommunication networks, to produce a large amount of useful data that can be used to generate Earth observations. In approaches in which the satellites are placed in LEO, the positions of the individual satellites can be obtained from readily available GNSS information from satellites in higher orbit and can be used to enhance the utility of the data obtained by the signal analyzers. The constellation can be configured for Earth observation such that each satellite is 3-axis stable with a nadir pointing main antenna.

Figure 3:
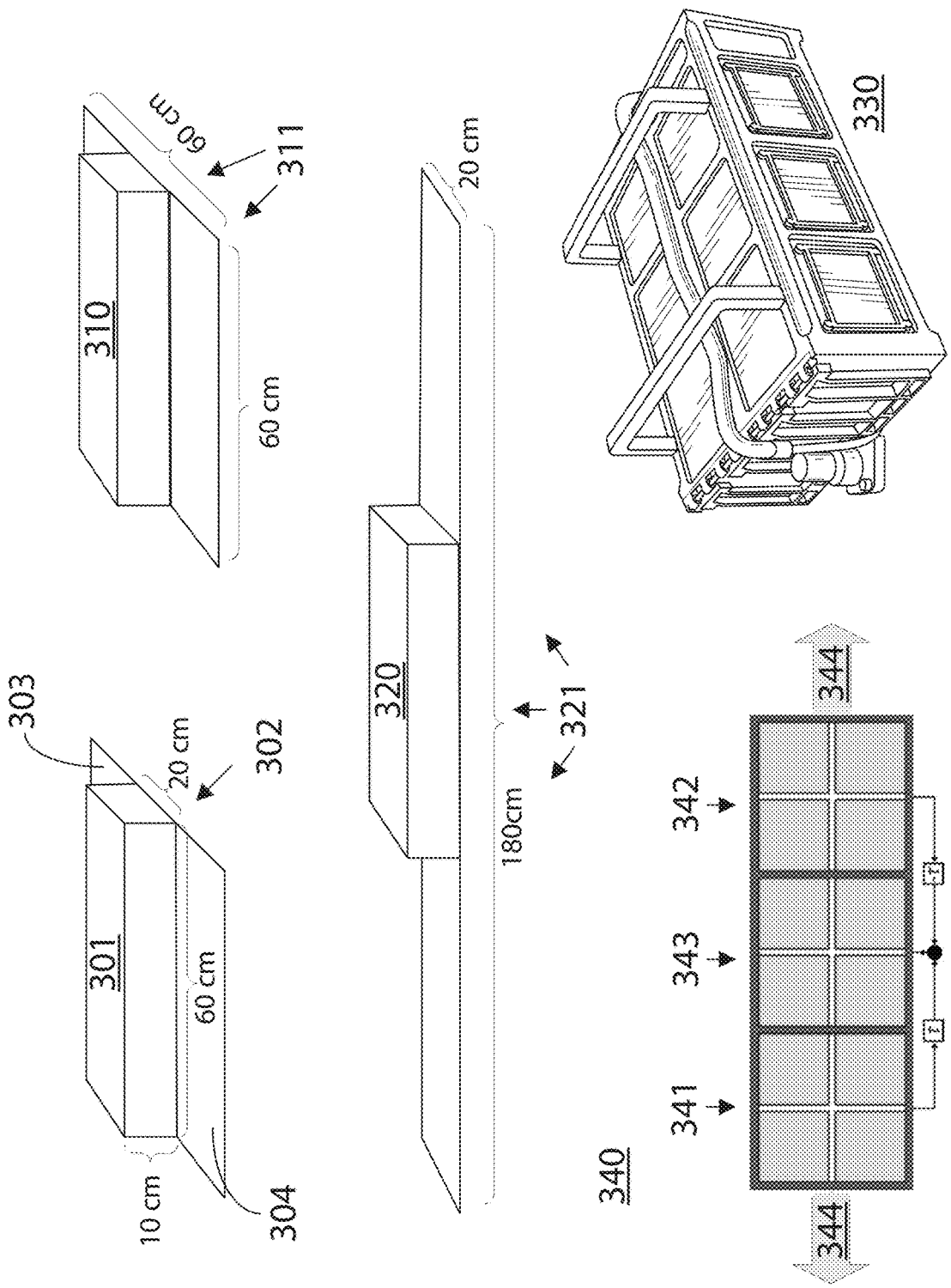
FIG. 3 provides illustrations of three types of cubesats that can be used in accordance with approaches disclosed herein.

In certain approaches, the constellation can conduct both altimetry and scatterometry using the same set of sounding signals. In addition, the constellation can be augmented with SAR and InSAR capabilities including the ability to conduct wide-swath InSAR topographic mapping. Absolute altimetry via signal delay measurement can be conducted by monostatic returns while bistatic and multistatic returns are applied for additional altimetry measurements, scatterometry, SAR, and InSAR. The performance of these multiple applications can exceed that provided by large dedicated single platform missions that are currently in orbit. Furthermore, in contrast to some current missions, the major elements of the individual cubesats in terms of the processor, avionics, signal analyzer, and structures are readily available parts. Three specific variants of the potential cubesats are illustrated in FIG. 3. All three variants are 60 cm×20 cm×10 cm (12 U) radar cubesats with largely common components. The satellites can have a main nadir-pointing antenna and an upward pointing antenna to receive GNSS signals. In some approaches, the satellites can also have side facing antennas for intra-constellation direct communication.

The satellites can each include a core with an embedded signal processor that can extract all the required quantities from the received sounding signals and/or GNSS signals including signal delay, amplitude, phase, frequency, polarization, and optional encoding. The signal analyzers can be PN code analyzers that extract a unique code for other satellites in the constellation from all sounding signals received by the signal analyzer. In approaches in which the sounding signals are encoded, radar altimetry can be conducted using the encodings, rather than a frequency sweep, to achieve high signal bandwidth for high measurement precision. Furthermore, in contrast to approaches in which the signals are not encoded, multiple radars in the constellation can operate concurrently at the same frequency and a single receiver can collect returns from many emitters at once. The core can also include frontend electronics for processing electrical signals from the antenna. The frontend electronics and antenna can be configured for high bandwidths and frequencies. For example, the frontends could be configured for frequencies exceeding 60 GHz. The cells could be configured with transmitters to transmit at 1.5, 5, and 13 GHz and receivers to receive at those frequencies. The core can also include a high-performance oscillator to execute accurate signal gating such as for conducting delay Doppler analysis, and/or for coherently combining radar returns for SAR imaging and InSAR analysis.

The core cell (or type 0 cell) 301 is designed for high precision altimetry and bistatic scatterometry as well as basic SAR. The 60 cm×20 cm chassis bottom 302 is a radar antenna. The wings 303 and 304 are foldout solar panels that extend from the chassis. Type 0 units alone can form a powerful Earth observation system. The main components of the type 0 cell can be readily configured to operate as a type 1 or type 2 cell by simply sizing the processor, power, and data systems to handle increased loads and by providing software to perform additional functionalities. The type 1 cell 310 is an extension of the type 0 cell in which the entire 60 cm×60 cm bottom surface 311 becomes a radar antenna with electronically steerable beams for two-dimensional altimetry and scatterometry as well as SAR and InSAR. The type 2 cell 320 is a further extension in which the two wings extend lengthwise to form a longer 180 cm×20 cm SAR antenna 321. All three cell types can be packaged in a dispenser such as the one illustrated in photograph 330 which shows a 6 U satellite dispenser prior to shipping for launch.

Figure 4:
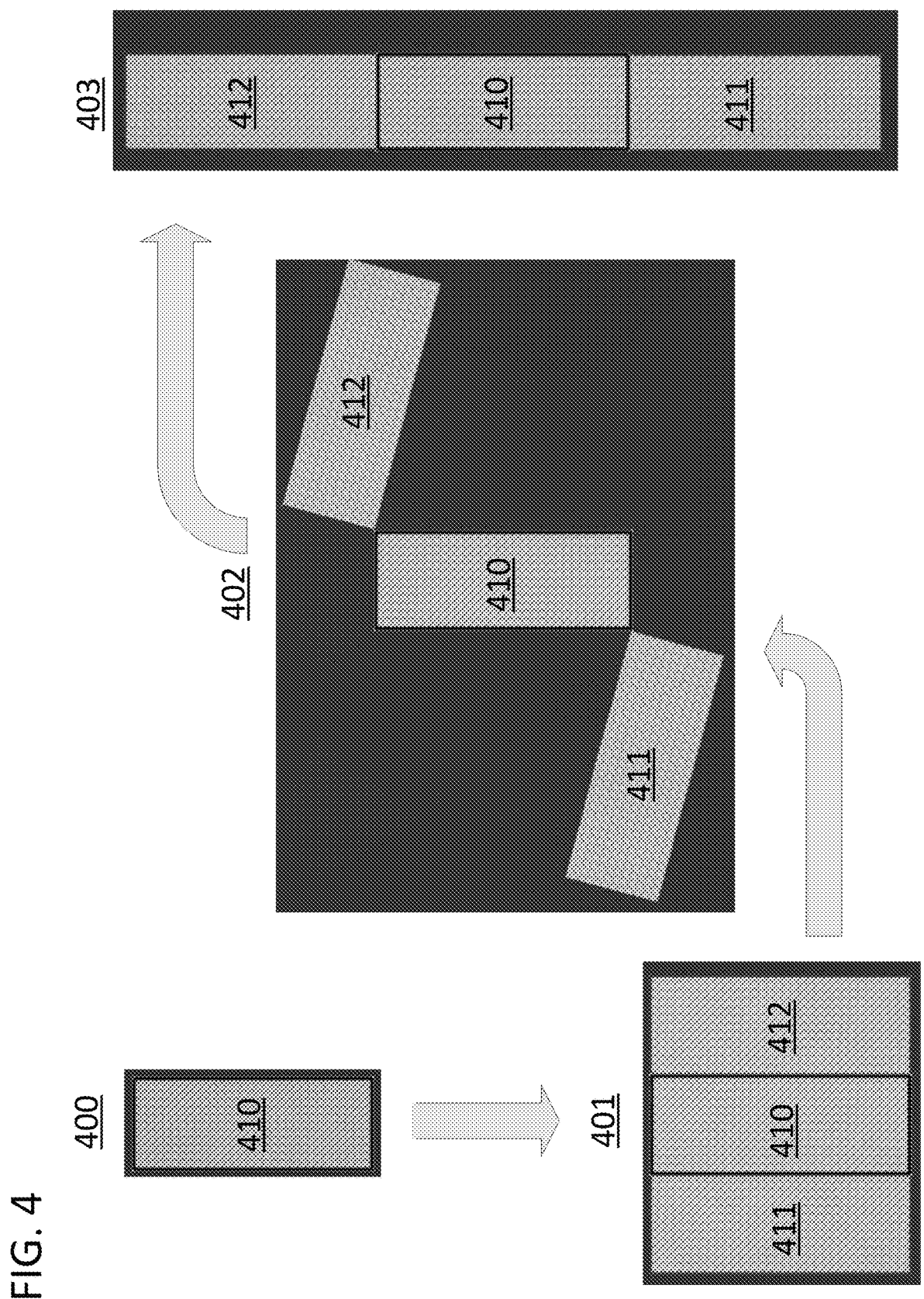
FIG. 4 provides an illustration of a fourth type of cubesat that can transform its configuration in orbit, and the different phases of that transformation, in accordance with approaches disclosed herein.

An alternative cell type is shown in FIG. 4 in which the cell can transition between type 1 and type 2 while in orbit to enhance the capabilities of a constellation to which it is a part. Satellite 400 transitions to phase 401 by extending out its wing panels, 411 and 412, from the chassis 410 to obtain the configuration of a type 1 cell. The wing panels may include solar panels for energy on one side and a nadir pointing antenna on the opposite side. The satellite can then transition from phase 401 to phase 403 by having the wing panels pivot around the sides of the satellite body as shown in transitional phase 402. In phase 403, the satellite is in a type 2 configuration. The satellite can also transition back into a type 1 cell at a later time while the satellite is in orbit by pivoting the wing panels back around the sides of the satellite body.

The antennas on the device can be configured to operate with beam steering, including one-dimensional beam steering off nadir in any single direction relative to the direction of orbit, or with full two-dimensional beam steering in any direction relative to the direction of orbit. Antenna 321 is illustrated in a bottom up view 340 to illustrate how a satellite in the constellation can be configured to operate with beam steering. One-dimensional beam steering can be achieved by having a variable delay t introduced differential between panel 341 and 342 relative to panel 343. The one-dimensional beam steering will be in the direction indicated by arrow 344. The satellite could then be oriented in any direction relative to the direction of orbit to thereby allow for beam steering in different angles relative to the direction of orbit. Each panel could also be divided into four 10×10 cm patch antennas combined to give nearly circular individual beams. Antenna 321 could be configured for two-dimensional steering by having the eight outer panels configured with selectable delays. As a result, the antenna will be able to point the beam up to 45° off-nadir at any azimuth. With no imposed relative delays, the natural beam of an antenna 321 would remain essentially circular.

Beam steering for broadcasting to and receiving from multiple targets can be conducted in numerous ways. Any such approach will allow the constellation to execute enhanced two-dimensional scatterometry and altimetry. In one approach, the beam is pre-selected and formed for both broadcast and reception such that it is pointed to specific spots for desired observations while omitting others. In another approach, specifically applicable to reception, each panel of the antenna could operate as an independent collector where what each panel received could be sampled and stored separately. The multiple data streams from the various panels could then be re-combined in arbitrary ways to direct the full antenna gain to multiple targets after the fact. In another approach, transmission could be conducted at relatively high power from just one of the panels in an antenna to give wide coverage, while reception was conducted with multiple panes. Given antennas such as those disclosed in FIG. 3, the pattern of observation would then include a wider cone of transmitted signal coverage surrounding a narrow cone of full-gain receiving beam at nadir. The narrow receiving beam could then be redirected to any number of arbitrary points after the fact, so long as the received signals from all the panels were preserved in storage for analysis.

The sounding signals can be optimized for the particular composition of a given constellation and the types of observations that will be conducted in terms of frequency, structure, and strength. As stated previously, the fact that the constellation generates its own sounding signals provides the system with this level of flexibility as an advantage over systems that passively observe reflections from other sources. The sounding signals could be at a variety of frequencies. A given constellation may also be designed to produce sounding signals at variable frequencies or a variable frequency. The sounding signal may be based at 13.6 GHz and 5 GHz, and may have a lower band below 5 GHz such as 1.2-1.6 GHz or L-band signals. In the case of a 1.2-1.6 GHz band, the constellation would be primed to receive not only the sounding signals produced by the constellation itself, but also to receive and acquire reflected GNSS signals to obtain even more data. Although self-generated signals are preferred, if the constellation is already designed to receive signals at frequencies generated by other widely available sources of reflected radio signals, those signals could also be observed by the constellation and combined with the self-generated signals to produce additional data.

Various combinations of the above specifications for individual satellites could be applied to produce numerous benefits for the constellation. In a particular approach, type 0 and/or type 2 satellites could be configured with beam steering and the ability to transmit at two frequencies in order to receive both across-track and along-track returns where the different types of returns could be distinguished based on their frequencies. The antennas could be designed for this purpose to operate at two frequencies up to +/−45° along the wide beam axis without steering and +/−45° along the narrow beam axis with 1D electronic beam steering. The satellites being oriented with their long axis along the direction of orbit in this example.

The composition of the constellation in terms of satellites can vary greatly while still achieving enhanced performance over prior approaches. Three type 0 cells can produce absolute altimetry, SAR imagery, wide swath InSAR, and scatterometry as they will provide two SARs for the InSAR surface topographic measurement along with a nadir return for absolute altimetry. However, even two type 0 cells can operate in wide swath InSAR mode with either cell switching occasionally to nadir altimetry mode to obtain absolute height. Indeed, if the SAR off-nadir angle is not too great (such as less than 20°) then nadir altimetry can be performed with range gated returns concurrent with SAR operation. However, the performance and capabilities of the constellation can increase dramatically as the number of satellites increases as there is less need for individual satellites to take turns conducting different observations and there is generally more data from which to derive observations. As stated previously, with full mutual visibility the constellation can produce $n^2$ independent measurements of equal spaced tracks simultaneously using single pulse sounding signals. Furthermore, the measurement total becomes immense when you remember that each satellite can also collect corresponding returns from many points out of the image plane.

Figure 6:
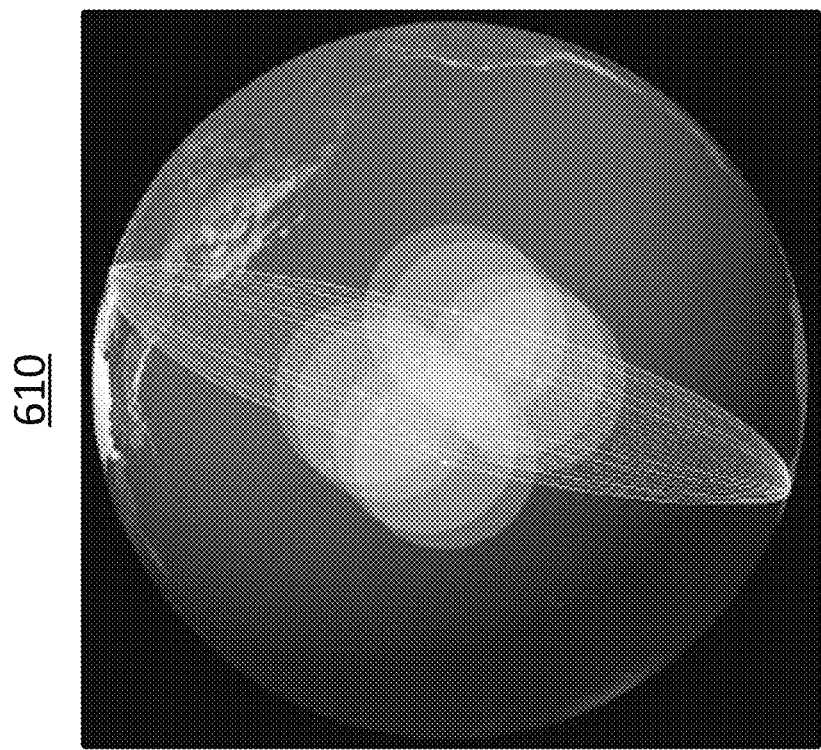
FIG. 6 provides a top-down orbit diagram for a constellation of satellites with uneven lateral orbit tracks and uneven axial spacing in accordance with approaches disclosed herein along with an illustration of a constellation in accordance with that diagram orbiting the Earth.
Figure 6:
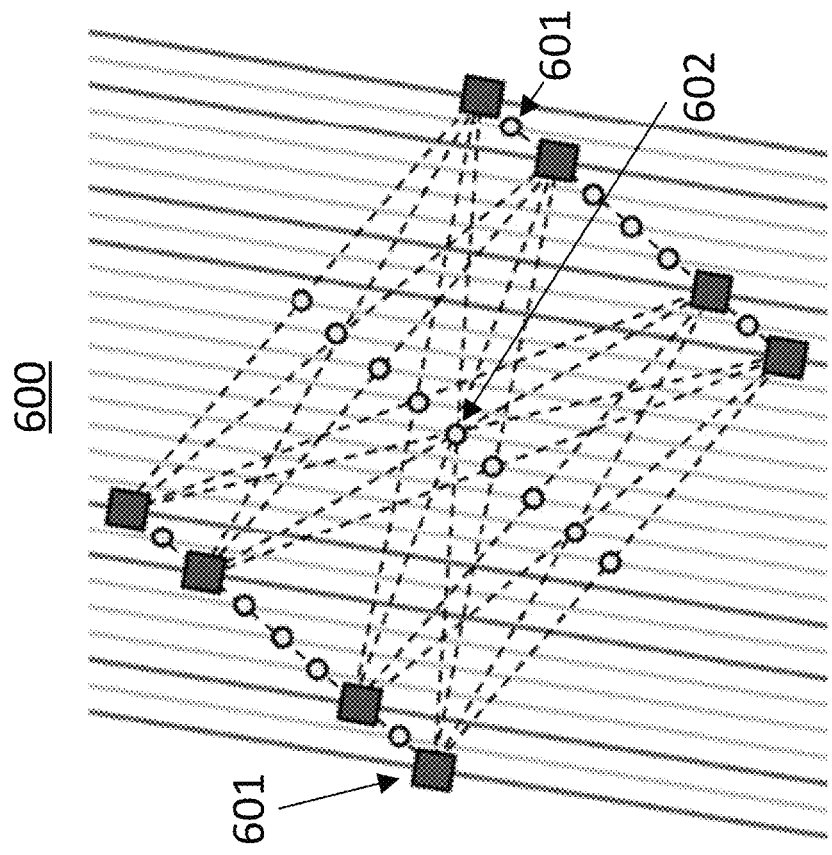

The manner in which each satellite transmits and receives scatter signals in steps 201-203, and the manner in which step 204 is conducted, can produce a broad spectrum of results. The conduct of the above-mentioned steps can also be continuously changing in order for the constellation to obtain different kinds of measurements or to optimize a desired measurement. Additionally, the satellites can be arranged to capture data from the same location at the same time from multiple perspectives, directions, or look angles while simultaneously sounding a widely distributed set of ground points. An example of such arrangements is provided below with reference to the orbit diagrams in FIGS. 6 and 8 and the accompanying description. Therefore, many observing functions would be available at all times through data analysis and through division of labor in the constellation as a whole. Where beam steering is applied, it can be done rapidly to maintain effective continuity of observations, or desired refresh rates, for all functions with no loss to the intended applications, making far more efficient use of the satellites than is possible with single-purpose systems. The constellation architecture introduces efficient concurrent and time-shared observations for various Earth observation missions.

The constellation can conduct altimetry measurements using standard approaches, but can also increase the performance of prior approaches through the generation of additional data. Absolute altimetry can be measured via signal delay measurement of monostatic returns or via bistatic and multistatic returns combined with location data for counterpart satellites. Relative altimetry measurements can be conducted using bistatic and multistatic returns.

Scatterometry can be measured by analyzing signal amplitude degradation from multiple angles. As the sounding pairs used to analyze signal amplitude degradation can be analyzed for delay at the same time as their amplitude is considered, relative altimetry and scatterometry information can emerge from a single observing system. In particular, in approaches in which the signals are PN-code modulated, a readily available PN-code signal analyzer can extract amplitude degradation and delay from a single pair of sounding signals automatically. For example, wind speed can be determined from the absolute amplitude of the returned signal in a sounding pair and wind direction can be obtained from an analysis of the variation of the absolute amplitude with the azimuth of the returned signal. Scatterometry can also be conducted by observing monostatic returns from off-nadir transmitted signals. Monostatic scatterometry observes backscatter of a signal transmitted direct at the Earth's surface obliquely. Returns are relatively weak as most energy scatters forward or in other directions. By comparison, the strength of the return signal and quality of data are greatly improved in the multistatic case. The use of multistatic sounding therefore greatly improves the capacity of the constellation to conduct accurate scatterometry.

SAR measurements can be conducted by directing beams from the satellites off nadir, lateral to the direction of orbit. The off-nadir angle could be anywhere from 10°–45°. A lateral SAR swath could then be observed by range-gating the returns by employing a series of delay windows. In a SAR measurement, rather than treating each return signal as a separate measurement, a series of return signals are captured and coherently combined to synthesize a larger aperture traced by the satellite's motion. In certain approaches, the coherently combined data can be analyzed in tandem with another set of coherently combined data to produce InSAR derivations. The processing and data storage capabilities of the constellation would need to be increased to support SAR and InSAR approaches, but the underlying hardware would not need to be extensively modified from approaches that just conducted altimetry or scatterometry.

The relative positions of the satellites within the constellation can be a set component of the mission or variable once the mission is in flight. The setting and adjusting of the spacing can be conducted relative to the direction of the constellation's orbit. The satellites can be shifted in flight while having their main antennas directed towards the Earth and remaining 3-axis stable. Alternatively, the fore-aft axis of individual satellites can also be rotated relative to the direction of the constellation's orbit while keeping the satellite 2-axis stable. An example of this was provided above in which the long axis of the type 2 satellites was described as being variable with respect to the direction of orbit. The lateral spacing can also be selected with horizontal resolution of observation and angle of reflection used as a constraint. As an example, the spacing and composition of the constellation could be set to have a maximum off-nadir look angle for the satellites that are farthest from the center axis of orbit for the constellation of 45°. The maximum look angles for the constellation will affect a tradeoff between forward scatter signals' stronger reflection, but slightly decreased altimetry accuracy. In general, the constellation can be designed to have full mutual visibility and a maximum look angle set by the physical characteristics of beam steering capabilities of the constellation's antennas.

Non-uniform lateral spacing can also be applied in order to maximize surface resolution with any cell arrangement. As stated previously, with n equal to the number of satellites, a constellation can observe $n^2$ specular reflections with any arrangement. However, uniform lateral spacing yields only $2n-1$ distinct reflection points. Non-uniform lateral satellite spacing can improve on this substantially. However, as Earth observation scientists are accustomed to the regular surface sampling from repeat tracks of current satellite-based altimeters, it is also desirable to produce a set of reflection points with uniform spacing. The question then becomes, given n satellites, what distribution offers the tightest ground track spacing while keeping all tracks equally spaced? When n is a power of 2, the solution is particularly efficient, where we define efficiency as the ratio of observation tracks for distinct reflection point to number of satellites in the constellation.

FIG. 5 illustrates three aft-perspective orbit diagrams for solutions to the question posed above in which n is equal to 4 satellites (500), 8 satellites (510), and 16 satellites (520) as derived using a flat earth model. Orbit diagram 515 is a top-down view of the 8-satellite case in which orbit tracks occupied by satellites are marked with rectangles 516 and orbit tracks for which a reflection point is generated, but no physical satellite is required are marked with circles 517. In the solution diagrams, circled dots 501 are satellite tracks and lone dots 502 are reflection point tracks. The upper numbers count the distinct reflection points while the lower numbers tell how many independent reflections occur at each point, assuming full mutual visibility. The 8-satellite case 510 yields 27 evenly spaced tracks (efficiency: 3.38). The 16-satellite case 520 yields 81 tracks (efficiency: 5.06). Furthermore, the lateral spacing of the satellites could be shifted if even track spacing was not required for a given application which would loosen the constraints of the optimization and increase the efficiency even more. The lateral spacing of the constellation could also be adjusted in flight if the observation needs of the constellation were to change during a given mission.

The satellites can be set in a straight line perpendicular to the direction of orbit, or at another angle relative to the direction of orbit. Such a configuration could be described as having a uniform axial spacing. The oblong antenna of the type 0 satellite provides an essentially elliptical beam well suited for this side-by-side arrangement. Orbit diagram 515 illustrates the satellites as rectangles 516 to illustrate how a type 0 or type 2 satellite could be oriented relative to the direction of orbit. If the long cell axis is in the direction of orbit as illustrated, the beam fans out to the sides toward the neighboring satellites. While the strongest bistatic returns can be acquired across-track, in both directions, in certain approaches each satellite can acquire both mono- and bistatic returns along-track, some distance away from the lateral axis of the constellation. Just how far off the lateral axis observations can be made depends on the antenna characteristics and/or how the antenna is operated such as via physical movement and/or delay induced beam steering.

Another benefit of the redundancy afforded by constellations in accordance with some of the approaches disclosed herein is that the off-nadir angle can be limited by discarding redundant reflections. For example, in an East-West linear array in accordance with orbit diagram 520 and an observation track spacing at the equator of 11 km, capturing all possible reflections would require the two outermost cells to transmit and receive at +/−41° off nadir. However, redundant reflections allow the omission of the widest pairs and still provide adequate information concerning all 81 tracks. Therefore, adequate observation can be achieved by limiting the off-nadir angle for all cells to +/−31°. Similar optimizations can be applied to other constellations with similar characteristics.

The satellites can also have a nonuniform axial spacing. The satellites can also be shifted axially during flight to shift between these configurations. Orbit diagram 600 is a top-down view of an 8-satellite constellation with nonuniform axial spacing in which orbit tracks occupied by satellites are marked with squares 601 and orbit tracks for which a reflection point is generated, but no physical satellite is required, are marked with circles 602. In particular, the specific points along the track at which the reflection point is generated are marked with a circle. Illustration 610 shows the flight pattern of that constellation in accordance with that orbit diagram as it orbits the Earth. The illustrated satellites are type 1 satellites with square antenna arrays using beam steering.

Certain benefits accrue to constellations in which the axial spacing is selected to generate reflection points such as reflection point 602. Reflection point 602 is of interest because multiple pairs of sounding signals strike that point from multiple perspectives. As illustrated, eight different sounding signals would impinge on reflection point 602 and generate eight forward scatter signals from four different perspectives and eight different directions. The result is highly useful information for scatterometry purposes. Furthermore, with beam steering, the cross-track soundings can all remain functional despite changes in the axial spacing. As illustrated, there are 27 distinct reflection points distributed in a two-dimensional pattern on equally spaced tracks. This allows instantaneous recovery of surface wind speed and direction at multiple points, while delivering undiminished altimetry on all 27 tracks.

Figure 7:
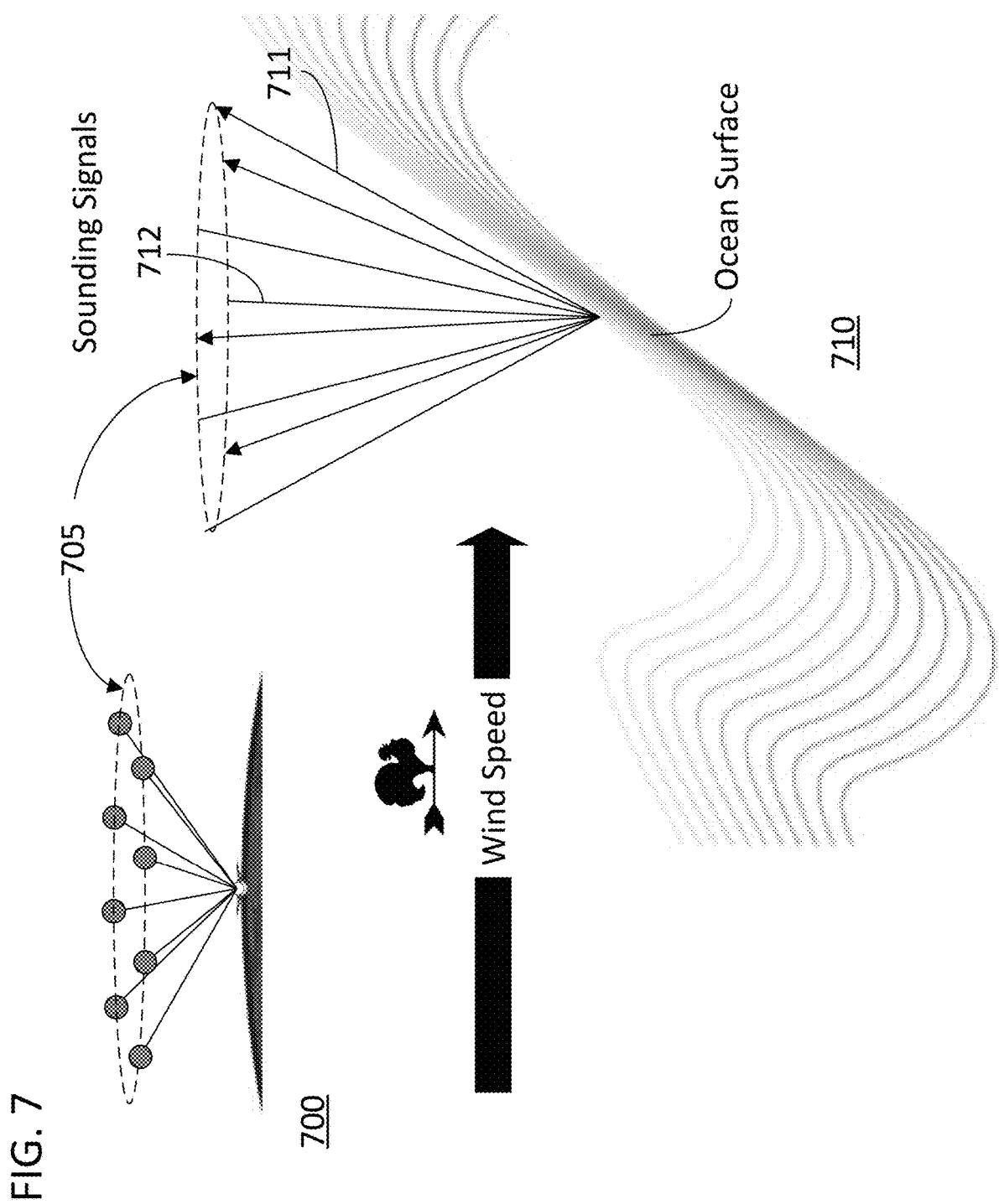
FIG. 7 provides an illustration of how multiple forward scatter signals can provide useful information for scatterometry analysis and the derivation of related Earth observations in accordance with approaches disclosed herein.

FIG. 7 provides an illustration of how multiple forward scatter signals from the same look angle can provide useful information for scatterometry analysis and the derivation of related Earth observations. FIG. 7 includes a diagram 700 of a constellation of satellites from an aft-perspective. From the illustrated perspective, the satellites can be seen to have orbit tracks with even lateral spacing. However, the constellation can have nonuniform axial spacing such as the constellation discussed with reference to FIG. 6. As such, the sounding signals from the constellation of satellites impinging on a given reflection point can be conceptualized as forming the surface of a cone 705 with an opening angle set by the lateral spacing of the constellation or portions of the constellation that are transmitting sounding signals to the given reflection point. As such, the satellites all have the same look angle with respect to the reflection point, and the reflection of the main forward scatter signal in all directions will be set by the opening angle of that cone. With the look angle set, the characteristics of the observed surface can be derived from the effect of direction on the change in amplitude of the received sounding signal.

As seen in illustration 710, scatterometry can be used to determine the condition of the ocean's surface at a given point, and to derive wind speed as a compound observation based on that scatterometric observation. Sounding signal 711, which impinges on the reflection point head on with a wave front on the ocean's surface, will be attenuated differently in comparison to sounding signal 712 which impinges on the reflection point perpendicular to the wave front. Analyzing the returns from many directions causes the accuracy of the observation to increase to ultimately present a full and accurate description of the surface area of the reflection point. By adjusting the axial spacing of the satellites, a full 360° observation can be conducted as can be seen in FIG. 8.

Figure 8:
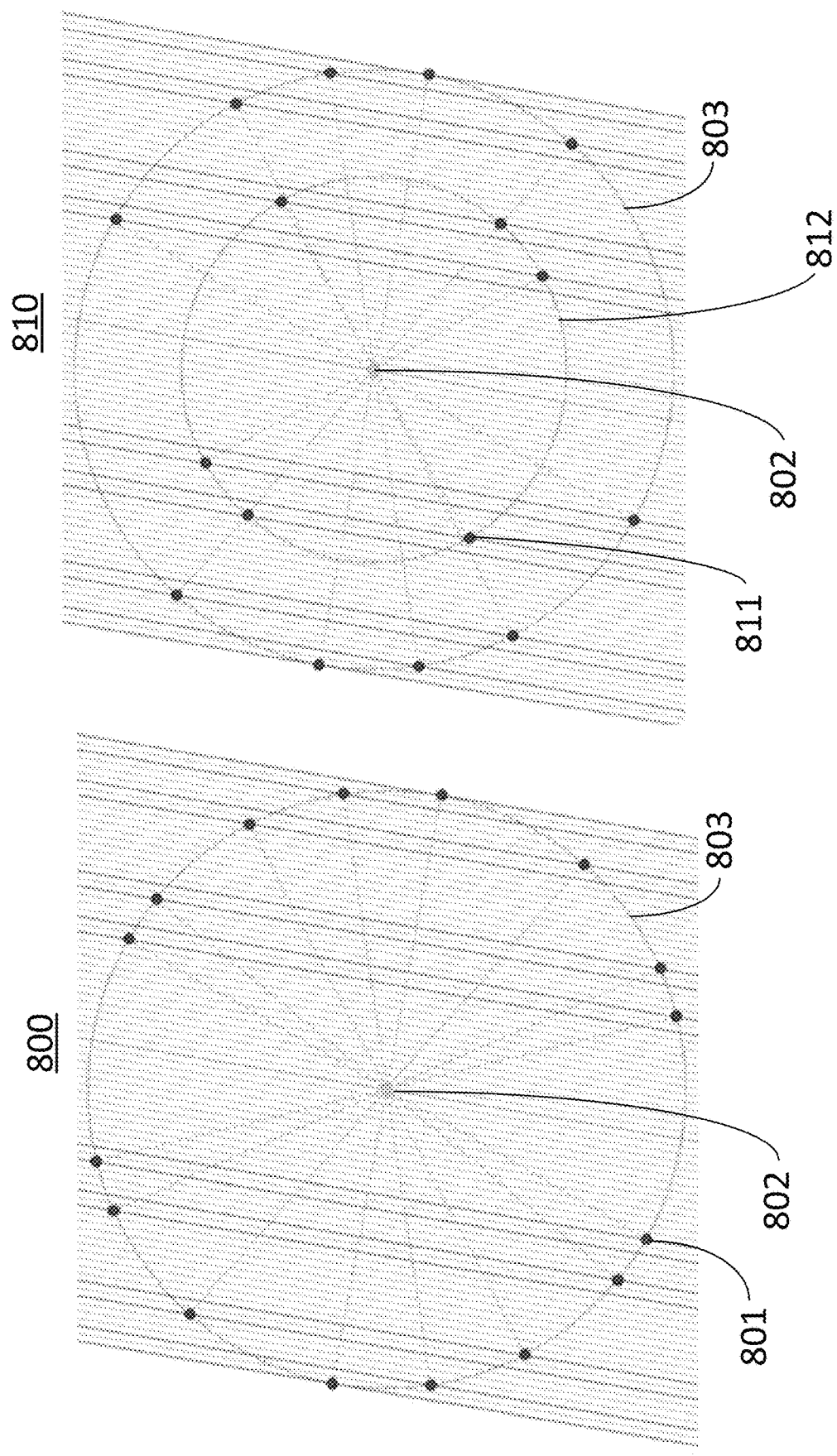
FIG. 8 provides two top-down orbit diagrams for a constellation of satellites with uneven lateral orbit tracks and uneven axial spacing in accordance with approaches disclosed herein.

FIG. 8 includes a first orbit diagram 800 in which the satellites in the constellation are illustrated by solid dots such as 801. The satellites have uneven lateral spacing while providing a full set of evenly spaced reflection points. The satellites also have nonuniform axial spacing. In particular, the satellites have been arranged along the direction of orbit such that they are all equidistant from a common observation point 802 which can serve as a single shared reflection point for each of the satellites. The satellites are then all located on the surface of a circle 803 with the shared reflection point at the center. All the illustrated observation tracks could be maintained in addition to providing multiple directional observation of point 802 by using beam steering.

Orbit diagrams similar to orbit diagram 800 could be implemented with type 1 cells with beam steering of up to ±45° off nadir at any azimuth. As such, when the constellation transmits a set of sounding signals, each satellite in the constellation shares a look angle relative to the single shared reflection point with every satellite in the constellation, but the reflection point is observed by a forward scatter signal generated from a number of directions "n" equal to the number of satellites in the constellation. The illustrated 16-cell constellation in orbit diagram 800, yields 16 unique reflections off the central point and 81 parallel, equally spaced tracks. This provides highly valuable information for a scatterometry determination as the same point is observed from nearly 360°. The broad distribution of azimuths provides more than enough information to determine Earth observations such as wind speed and direction at the shared reflection point instantaneously.

The spacing of the nonuniform axial spacing can be shifted in flight to change the location of the shared reflection point. After shifting the axial spacing, a second set of forward scatter signals can be reflected off this second shared reflection point. As the shared reflection point shifts laterally away from the center of the constellations, the number of satellites that can be configured to be located equidistant from the shared point begins to shrink. However, a sufficient number of forward scatter signals generated by satellites with a common look angle of a single point can generally still be obtained through an appreciable portion of the constellation's lateral extent with constellations having in excess of 8 satellites.

The axial spacing of the constellation can also be shifted to change the shared look angles from which multiple soundings are reflected. The process involves choosing a desired look angle, computing the required separation between two cells to achieve that angle for a bistatic reflection, drawing a circle of that diameter centered at a location (or latitude) of interest, laterally spacing the satellites so that as many of the orbit tracks are within the circle, and sliding the positions of the satellites along the tracks axially to put a sufficient number of satellites on the circle. The lateral spacing of the satellites can also be set as part of the mission or adjusted in flight to assure sufficient orbit tracks are within the circle.

The axial spacing of the constellation can also be shifted to obtain multiple shared look angles from which multiple soundings are reflected. In orbit diagram 810, a subset of satellites, such as 811, have been axially shifted to create another circle 812 centered around the shared reflection point 802 with a subset of 10 satellites falling on outer circle 803 and 6 satellites falling on inner circle 811. As such, when the constellation transmits sounding signals, a first subset of satellites in the constellation is equidistant from the reflection point according to a first distance, and a second subset of satellites in the set of satellites is equidistant from the reflection point according to a second distance. Even with this split in look angles, the mix of azimuths on each circle is sufficient to yield accurate wind speed and direction at both incidence angles, which can be combined in a more refined estimate. With adequate beam steering, or equivalent approaches, observations on all 81 observation tracks is preserved. In practice, the orbital motion will distort the shapes of these orbit diagrams somewhat, particularly at higher latitudes. Regardless, the static two-dimensional geometry of the sounding signals presents an advantage of systems with a mix of returns from various points and directions at various angles and distances.

While these benefits are enhanced with the number of satellites, a set of at least four satellites can be utilized to generate two sets of forward scatter signals of the same reflection point from four azimuths with the same look angle and thereby conduct highly accurate scatterometry. Observing a surface point from many incident azimuths and from both directions at once provides better surface sensing than approaches that do not, particularly for surface sensing meant to determine wind direction. Furthermore, the use of a fully symmetric observation platform assures that the measurements are obtained by forward scatter signals with strong returns as opposed to back scatter returns of a signal directed at the Earth's surface obliquely. Back scatter returns are relatively weak as most energy scatters forward or in other directions. Forward scatter collected by other satellites provides a wealth of information such as observations of sea state, ocean surface height, and ocean surface vector winds.

As stated previously, in approaches in which the constellations generate their own sounding signals, the characteristics of those sounding signals can be optimized for their specific purpose. In particular, the pulse repetition rates for the sounding signals can be managed to minimize power draw. Any given satellite in the constellation may only need to transmit less than 2% of the time depending on the sounding approach applied. The combination of sporadic pulsing and low power requirements per pulse results in a system that is highly energy efficient. Approaches for sounding signal pulsing include concurrent nadir pulsing, strobed nadir pulsing, concurrent nadir plus off-nadir pulsing, and strobed nadir plus concurrent off-nadir pulsing.

With an LEO constellation aligned laterally cross-track and conducting concurrent nadir pulsing, in which all satellites transmit together at nadir, pulse duration may be a few msec while the interval between pulses is over 100 msec. Each cell would then collect nadir and lateral reflections. With this approach, the prospects for scatterometry along track may seem minimal. However, it can be done to some degree using delay-Doppler filtering (DDF) as will be described below.

The constellation could also conduct strobed nadir pulsing in which each satellite transmits in sequence, one at a time at nadir. With an LEO constellation having the configuration of orbit diagram 520, and allowing 9 msec returns for each pulse, resolution of 1 km altimetry could still be achieved along track as well as along-track scatterometry by DDF. The key benefit of this approach being no need to distinguish concurrent reflections from multiple cells.

The constellation could also conduct concurrent nadir plus off-nadir pulsing. The satellites in the constellation could be configured for along-track beam steering. In this approach, all cells could transmit first at nadir, then at specific angles off-nadir fore, and then at the same angle aft. The sequence could then be repeated, possibly with different off-nadir angles to target different reflection points. This would allow for high-quality along track scatterometry to complement the inherently strong across-track observations.

DDF observations can significantly enhance the measurement capabilities of a constellation while preserving power, by obtaining more information from a given set of sounding signals. This approach can involve gating a time delay of the sounding signals and gating a frequency shift of the sounding signals. Each satellite in the constellation can also include an electrical analog or digital filter for gating a frequency shift of the forward scatter signals. The filtering can be conducted based on a priori knowledge of the frequency at which the sounding signals that produced the forward scatter signals were transmitted. For example, the filtering can include a variable band pass filter centered around a frequency of 13 GHz if the constellation is configured to generate sounding signals at 13 GHz. By gating both time and frequency shift a specific reflection point within a wide area can be selected and observed by the constellation.

Figure 9:
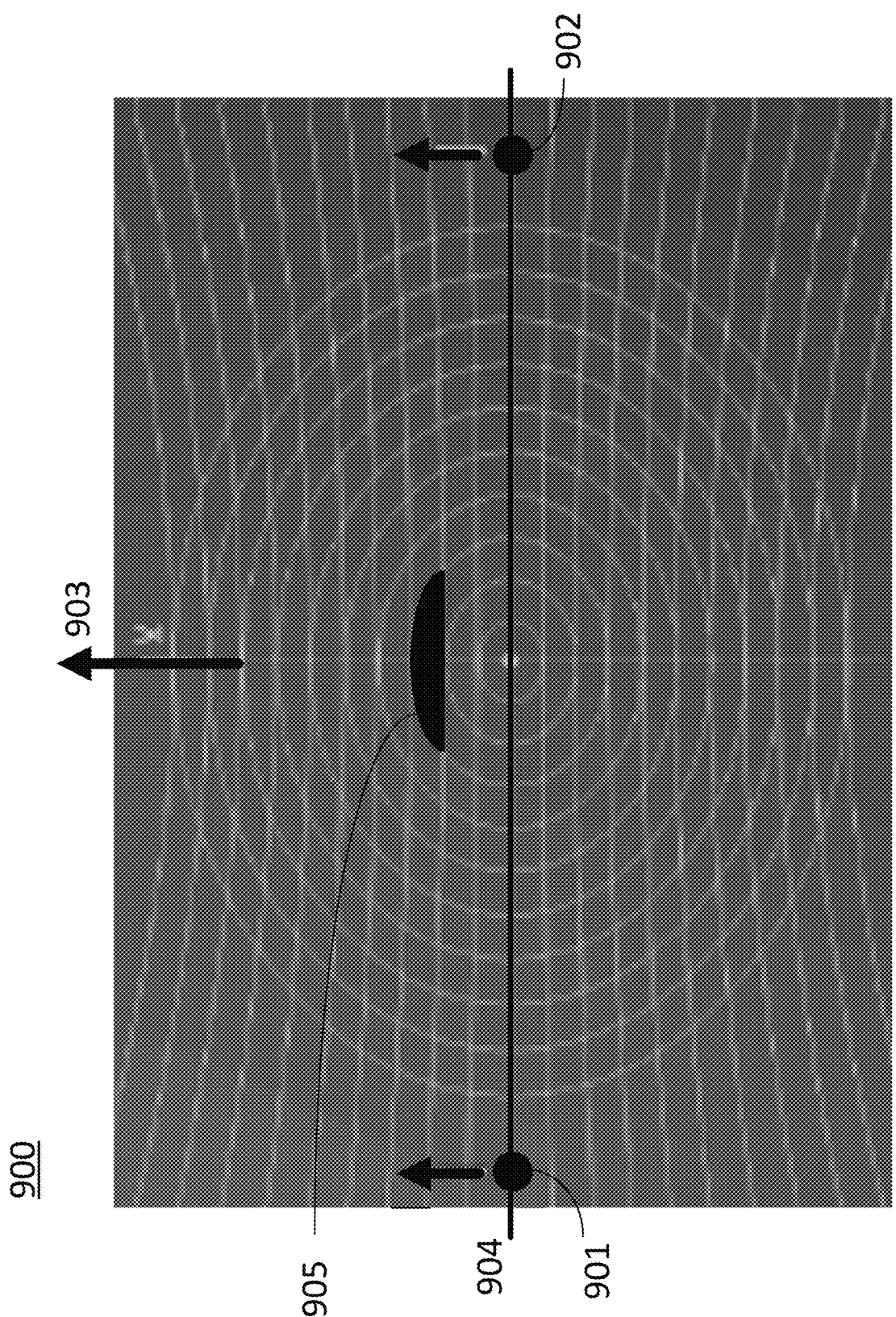
FIG. 9 provides an illustration of a constellation conducting multistatic delay Doppler observations in accordance with approaches disclosed herein.

FIG. 9 provides a top-down view 900 of two satellites 901 and 902 conducting DDF in order to obtain measurements off the line connecting them, fore and aft. While only two satellites are shown, the principle can be extended to any number of satellites. In the figure, the two satellites are traveling in orbit direction 903, and are spaced laterally along an axis 904. While the satellites are shown traveling in a direction that is perpendicular to the line connecting the two satellites, similar principles can also be applied to satellites with orbit directions at different angles from their connecting line. The pattern of view 900 is made up of a series of concentric ellipses, and a set of hyperbolas centered about axis 904 extending out in either direction from that axis. The concentric ellipses define reflection points that can be isolated by one or the other satellites using range gating. They are elongated lateral to the direction of orbit. The center point corresponds with range gating at the specular reflection point midway between the satellites, with the delay of the range gating increasing with the major axis of the ellipse. The hyperbolas define reflection points that can be isolated using frequency shift gating. The observed Doppler shift is simply the sum of the one-way Doppler shifts from each satellite to the selected reflection point and is therefore zero at the specular reflection point. By using a combination of frequency and range gating reflection points, such as 905, can be isolated and observed using the illustrated signals without beam steering. As a result, a multi-correlator DDF method allows observations of many points concurrently fore and aft along the path of the midpoint to enhance the range of available observations for the constellation.

DDF can also be conducted by satellites that have non-uniform axial spacing, and indeed will operate with satellite constellations that are traveling in the same orbit track. The corresponding pattern for the case of two satellites in the same orbit track will be similar to view 900 except that the ellipses are elongated in the direction of orbit. The observed Doppler shift will be the sum or the one-way Doppler shifts from each satellite to the selected reflection point and will hence be zero at the mid-point as in even axial spacing case. For a constellation of satellites with 1 m nadir antennas transmitting a 6 cm wavelength from 600 km the satellite will see only about 1.7° off nadir with a round trip Doppler shift of about 7.55 kHz fore and aft. With a bistatic pair at 600 km separated by 3° along a single obit track, the observed Doppler shift 1.7° fore and aft of the mid-point (as observed from each cell) is nearly the same: 7.35 kHz.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a single satellite, distributed across a constellation of satellites, or network accessible to the satellite.

As stated previously, processing can be conducted in a distributed fashion by the satellites and can be conducted with the aid of a terrestrial computing system. Processing can be conducted in real time or using batch processing by any such system. Although examples in the disclosure were generally directed to transmitting signals towards the Earth for observation, similar systems and methods could be applied to obtain measurements regarding any mass with sufficient gravity to maintain satellites in its orbit. These and other modifications and variations to the present invention may be practiced by those skilled in the art, without departing from the scope of the present invention, which is more particularly set forth in the appended claims.

What is claimed is:

1. A method for operating a symmetrical multistatic constellation of at least four satellites to generate a set of Earth observations comprising:
    transmitting a set of at least four sounding signals from the constellation towards the Earth, wherein each satellite in the constellation individually generates at least one sounding signal in the set of sounding signals;
    detecting a set of at least four forward scatter signals from the Earth using the constellation, wherein:
    the signals in the set of forward scatter signals uniquely correspond with the signals in the set of sounding signals to form a set of sounding pairs; and
    the signals in each sounding pair in the set of sounding pairs are transmitted and received by different satellites in the constellation;
    analyzing, using a set of at least four signal analyzers, the set of at least four forward scatter signals to obtain a set of data, wherein each satellite in the constellation individually houses a signal analyzer in the set of at least four signal analyzers; and
    deriving the set of Earth observations using the set of data.

2. The method of claim 1, wherein:
    the set of data includes the phase, amplitude, delay, frequency and polarization of the set of forward scatter signals; and
    the deriving includes scatterometry derivations and altimetry derivations.

3. The method of claim 1, wherein:
    each satellite in the constellation individually generates at least two time-gated sounding signals in the set of sounding signals;
    each satellite in the constellation includes an oscillator, whereby the constellation includes a set of oscillators;
    the transmitting and detecting steps are conducted using the set of oscillators; and
    the deriving includes synthetic aperture radar derivations.

4. The method of claim 1, wherein:
    each satellite in the constellation individually generates at least two sets of time-gated sounding signals in the set of sounding signals;
    each satellite in the constellation includes an oscillator, whereby the constellation includes a set of oscillators;
    the transmitting and detecting steps are conducted using the set of oscillators; and
    the deriving includes interferometric synthetic aperture radar derivations.

5. The method of claim 1, wherein:
    each signal in the set of sounding signals is encoded using a unique PN code from a set of PN codes; and
    the signal analyzers in the set of signal analyzers are PN-code signal analyzers.

6. The method of claim 1, further comprising:
    detecting a set of at least four back scatter signals from the Earth using the constellation, wherein the signals in the set of back scatter signals uniquely correspond with the signals in the set of sounding signals to form a set of monostatic sounding pairs.

7. The method of claim 6, further comprising:
    spacing the constellation using a nonuniform lateral spacing; and
    reflecting the set of at least four forward scatter signals from the Earth at a set of reflection points on the Earth;
    wherein the constellation includes a number of satellites;
    wherein the set of sounding pairs has a set size equal to n squared where n is the number of satellites in the constellation;
    wherein the set of reflection points is greater than twice the number of satellites; and
    wherein the set of reflection points has a uniform lateral spacing.

8. The method of claim 1, wherein:
    the transmitting of the set of at least four sounding signals targets a single shared reflection point on the Earth; and
    the transmitting of the set of at least four sounding signals is conducted at a single time using a set of at least four oscillators located on the constellation of at least four satellites.

9. The method of claim 8, wherein:
    when the constellation transmits the set of at least four sounding signals, each satellite in the constellation shares a look angle relative to the single shared reflection point with every satellite in the constellation.

10. The method of claim 1, further comprising:
    spacing the constellation using a nonuniform axial spacing; and
    reflecting the set of at least four forward scatter signals from the Earth at a single shared reflection point on the Earth;
    wherein, when the constellation transmits the set of at least four sounding signals, each satellite in the constellation is equidistant from the single shared reflection point.

11. The method of claim 1, further comprising:
    spacing the constellation using a nonuniform axial spacing; and
    reflecting the set of at least four forward scatter signals from the Earth at a single shared reflection point on the Earth;
    wherein, when the constellation transmits the set of at least four sounding signals, a first subset of satellites in the constellation is equidistant from the reflection point according to a first distance;
    wherein, when the constellation transmits the set of at least four sounding signals, a second subset of satellites in the set of satellites is equidistant from the reflection point according to a second distance; and
    wherein the first and second distances are not equal.

12. The method of claim 1, further comprising:
    spacing the constellation using a nonuniform axial spacing;
    reflecting the set of at least four forward scatter signals from the Earth at a first single shared reflection point on the Earth;
    shifting the nonuniform axial spacing; and
    reflecting a second set of at least four forward scatter signals from the Earth as a second single shared reflection point on the Earth;

wherein the first single shared reflection point and the second single shared reflection point are laterally shifted across the constellation.

13. The method of claim 1, wherein detecting the set of at least four forward scatter signals from the Earth using the constellation further comprises:
gating a time delay for the set of at least four forward scatter signals using a set of oscillators; and
gating a frequency shift for the set of at least four forward scatter signals;
wherein each satellite in the constellation includes an oscillator in the set of oscillators.

14. The method of claim 1, wherein the Earth Observations comprise:
relative topography, surface wind speed and direction, and absolute altitude.

15. A method for operating a constellation of at least four satellites to generate a set of Earth observations comprising:
transmitting a set of sounding signals from the constellation towards the Earth, wherein each satellite in the constellation individually generates at least one sounding signal in the set of sounding signals;
detecting a set of forward scatter signals from the Earth using the constellation, wherein:
the signals in the set of forward scatter signals uniquely correspond with the signals in the set of sounding signals to form a set of sounding pairs; and
the signals in each sounding pair in the set of sounding pairs are transmitted and received by different satellites in the constellation;
analyzing, using a set of signal analyzers, the set of forward scatter signals to obtain a set of data, wherein each satellite in the constellation individually houses a signal analyzer in the set of signal analyzers; and
deriving the set of Earth observations using the set of data;
wherein the analyzing step is conducted using a number of forward scatter signals equal to n(n−1) where n is the number of satellites in the constellation.

16. The method of claim 15, wherein:
the set of data includes the phase, amplitude, delay, frequency and polarization of the set of forward scatter signals; and
the deriving includes scatterometry derivations and altimetry derivations.

17. The method of claim 15, wherein:
each satellite in the constellation individually generates at least two sets of time-gated sounding signals in the set of sounding signals;
each satellite in the constellation includes an oscillator, whereby the constellation includes a set of oscillators;
the transmitting and detecting steps are conducted using the set of oscillators; and
the deriving includes interferometric synthetic aperture radar derivations.

18. The method of claim 15, wherein:
each signal in the set of sounding signals is encoded using a unique PN code from a set of PN codes; and
the signal analyzers in the set of signal analyzers are PN-code signal analyzers.

19. The method of claim 15, wherein:
the transmitting of the set of sounding signals targets a single shared reflection point on the Earth; and
the transmitting of the set of sounding signals is conducted at a single time using a set of at least four oscillators located on the constellation of at least four satellites;
wherein when the constellation transmits the set of sounding signals, each satellite in the constellation shares a look angle relative to the single shared reflection point with every satellite in the constellation.

20. The method of claim 15, further comprising:
spacing the constellation using a nonuniform axial spacing; and
reflecting the set of forward scatter signals from the Earth at a single shared reflection point on the Earth;
wherein, when the constellation transmits the set of sounding signals, each satellite in the constellation is equidistant from the single shared reflection point.

21. The method of claim 15, further comprising:
spacing the constellation using a nonuniform axial spacing; and
reflecting the set of forward scatter signals from the Earth at a single shared reflection point on the Earth;
wherein, when the constellation transmits the set of sounding signals, a first subset of satellites in the constellation is equidistant from the reflection point according to a first distance;
wherein, when the constellation transmits the set of sounding signals, a second subset of satellites in the set of satellites is equidistant from the reflection point according to a second distance; and
wherein the first and second distances are not equal.

22. The method of claim 15, further comprising:
spacing the constellation using a nonuniform axial spacing;
reflecting the set of forward scatter signals from the Earth at a first single shared reflection point on the Earth;
shifting the nonuniform axial spacing; and
reflecting a second set of forward scatter signals from the Earth as a second single shared reflection point on the Earth;
wherein the first single shared reflection point and the second single shared reflection point are laterally shifted across the constellation.

23. The method of claim 15, wherein detecting the set of forward scatter signals from the Earth using the constellation further comprises:
gating a time delay for the set of forward scatter signals using a set of oscillators; and
gating a frequency shift for the set of forward scatter signals; and
wherein each satellite in the constellation includes an oscillator in the set of oscillators.

24. A method for operating a constellation of at least four satellites to generate a set of Earth observations comprising:
transmitting a set of at least four signals towards the Earth using the constellation;
receiving, after transmitting the set of at least four signals, a set of at least four reflected signals from the Earth using the constellation, wherein the set of at least four reflected signals are the set of at least four signals after having been reflected from the Earth;
analyzing, after receiving the set of at least four signals, and using a set of at least four signal analyzers, the set of at least four signals to generate a set of data, wherein each satellite in the constellation individually houses a signal analyzer in the set of at least four signal analyzers;
deriving the set of Earth observations using the set of data;
wherein each satellite receives a signal in the set of at least four signals from every other satellite in the constellation;

wherein the set of data includes the phase, amplitude, delay, frequency and polarization of the set of at least four signals; and wherein the deriving includes scatterometry derivations and altimetry derivations.

* * * * *